United States Patent [19]

Morrish

[11] Patent Number: 4,769,577
[45] Date of Patent: Sep. 6, 1988

[54] CATHODE RAY TUBE DISPLAY WITH COMBINED DEGAUSS AND SURGE LIMITING CIRCUIT

[75] Inventor: Andrew J. Morrish, Eastleigh, United Kingdom

[73] Assignee: International Business Machines Corporation, Armonk, N.Y.

[21] Appl. No.: 27,592

[22] Filed: Mar. 18, 1987

[30] Foreign Application Priority Data

Jul. 16, 1986 [EP] European Pat. Off. ......... 86305469.8

[51] Int. Cl.⁴ .......................... H04N 9/29; H01J 29/06
[52] U.S. Cl. ......................................... 315/8; 361/150
[58] Field of Search ..................... 315/8; 361/150, 267

[56] References Cited

U.S. PATENT DOCUMENTS

| | | | |
|---|---|---|---|
| 3,433,993 | 3/1969 | Norley | 315/8 |
| 3,733,524 | 5/1973 | Cooksey et al. | 317/157.5 |
| 4,295,078 | 10/1981 | Wilmarth | 315/8 |
| 4,441,052 | 4/1984 | Willis | 315/8 |
| 4,445,072 | 4/1984 | Fredres | 315/8 |
| 4,489,253 | 12/1984 | Godawski | 315/8 |
| 4,636,911 | 1/1987 | Truskalo | 361/150 |

FOREIGN PATENT DOCUMENTS 2080077 1/1982 United Kingdom .

*Primary Examiner*—David K. Moore
*Assistant Examiner*—Mark R. Powell
*Attorney, Agent, or Firm*—David A. Mims, Jr.; Jeffrey S. LaBaw; T. J. Kilgannon

[57] ABSTRACT

A color cathode ray tube display includes a degauss coil and a switched mode power supply. The degauss coil is connected in series with the input rectifier (5) of the SMPS to limit the current surge on power on but is shorted out by a switch, preferably constituted by a triac, after the SMPS switching transistor turns on to give substantially zero residual degauss current. Forward voltage drop across the triac can be compensated for by back-to-back diodes (13) connected in series with the degauss coil. The triac is switched under control of a signal from an auxiliary winding on the SMPS output transformer (a).

8 Claims, 3 Drawing Sheets

CATHODE RAY TUBE DISPLAY WITH COMBINED DEGAUSS AND SURGE LIMITING CIRCUIT

BACKGROUND OF THE INVENTION

The present invention relates to improvements in color cathode ray tubes. More particularly, it relates to a cathode ray tube display having a combined degauss and surge limiting circuit.

A typical color cathode ray tube display includes a degauss coil and associated circuitry which allows demagnetization of the CRT's shadowmask. In known color monitors such as the IBM 3279, 5279 and 5379 displays, a coil is fixed around the CRT and is energized upon power-on by alternating current from mains voltage supply fed through a thermistor having a positive temperature coefficient. The current causes the thermistor to heat up, thus limiting the current in an exponentially decaying fashion. Additional resistors or thermistors are required to maintain the temperature of the current limiting thermistor to reduce the current to a minimum level so as not to cause interference in the CRT.

Typical degauss circuits suffer from the following disadvantages:
(a) A wide range thermistor is required to limit the current.
(b) Power is always dissipated by the heating elements.
(c) The thermistor is relatively costly.
(d) There is a current surge into the coil upon switch-on.
(e) Some time, about ten minutes, after power-off is required for the thermistor to cool sufficiently to enable an effective degauss current to flow upon subsequent switch on.
(f) Normally, different circuits are required for different mains voltages in order to satisfy the conditions of maximum and minimum current limits.

The last two disadvantages have led to the use of a separate external switch to supply the degauss coil but this is clearly an undesirable additional expense.

Many CRT televisions and monitors, for example the aforementioned IBM 5279 display, use a switched mode power supply (SMPS) and some method is required to limit the large current pulse in the mains supply when power is connected to the SMPS to avoid damage thereto. The conventional method of limiting the surge current is to use a low-value high-power resistor (for example 10 ohms, 10 watts) in series with the supply to the primary supply (input) rectifiers of the SMPS. This has the disadvantage of dissipating considerable power during normal operation. The problem is worsened by the need of the SMPS to cope with a large range of input supply voltages. The problem has been overcome in the past by either using a thermistor having a negative temperature coefficient to limit the current, the decreasing resistance of the thermistor with increasing temperature reducing power dissipation when the supply is operating, or by using a triac powered from a winding on the SMPS transformer to short the resistor out when the supply is running. The first method is not practical unless a thermistor with a very fast thermal recovery time is used and the second method is usually regarded as an extravagance given the limited function of the circuit.

SUMMARY OF THE INVENTION

An object of the present invention is to mitigate these various disadvantages of conventional degauss circuits and current surge limiting circuits by operating a combined degauss and surge limiting circuit over a wide range of supply voltages, for example, 90 to 265 volts AC.

Apart from the relatively low cost of using a combined circuit with its reduced component numbers, the invention has the added advantage that only one circuit is needed to cover the two main voltage ranges found throughout the world (110 v and 240 v).

According to the invention, a cathode ray tube display comprises a switched mode power supply, and a degauss coil connected to the main power supply for degaussing the cathode ray tube during power on of the display, and is characterized in that said degauss coil is connected in series with the input of the switched mode power supply to limit surge current therein, and in that a switch is connected across the coil in such a manner as to short out the coil after the switched mode power supply has turned on.

BRIEF DESCRIPTION OF THE DRAWINGS

The invention will now be particularly described, by way of example, with reference to the accompanying drawings, in which.

DETAILED DESCRIPTION OF THE PREFERRED EMBODIMENTS

Figure 1:
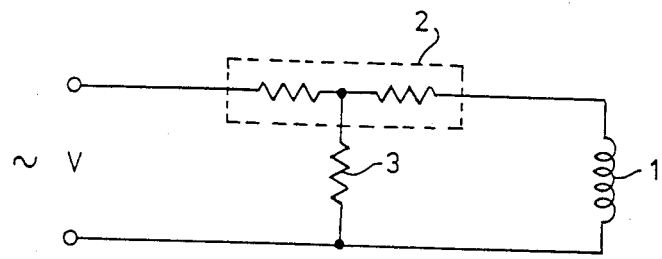
FIG. 1 shows the use of a known thermistor/heating resistor arrangement for providing the degauss current to a degauss coil.

Referring now to FIG. 1, a schematic of the degauss circuit of the IBM 5279 color display is shown, the degauss coil 1 is supplied by main voltage V through a dual thermistor 2 having a positive temperature coefficient.

A heating resistor 3 is connected to maintain the temperature of the thermistor 2 at a sufficiently high operating value. The degauss coil 1 typically has a resistance of 33 ohms and, for a 240 volt main supply, the heating resistor 3 has a value of 330 ohms of 5 watts rating. for a 110 volt main supply, the resistor 3 would have a value of 100 ohms, 5 watts rating. Typically thermistors have resistances which change from about 8 ohms up to 10 Kohms (or vice versa for negative temperature coefficients).

Figure 2:
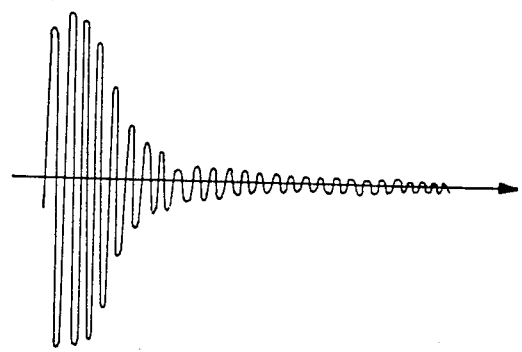
FIG. 2 shows the degauss current characteristic from the arrangement of FIG. 1 from start-up at room temperature.

FIG. 2 shows the current characteristic of such a degauss circuit. From a peak of about 5 amps, the current decays approximately exponentially to about 0.2 amp after some 250 msecs or so. Although such an arrangement gives acceptable results, it does suffer from the disadvantage that during operation there is power dissipation within the thermistor 2 and heating resistor 3. Furthermore, to operate the degauss circuit, the thermistor must be allowed to cool since otherwise there will be insufficient current for effective degaussing.

Figure 3:
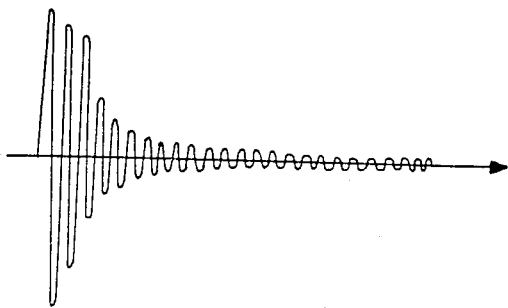
FIG. 3 shows the degauss current characteristic when switching on a display which has been allowed to cool for 10 minutes.

FIG. 3 shows the degauss current characteristic after the color display has been operated for 10 minutes and then switched off and allowed to cool for a further 10 minutes. It will be seen that the peak current is about 4.5 amps decaying more rapidly than the characteristic of FIG. 2. A longer cooling period would give a higher peak current whereas a shorter period may give rise to insufficient peak current for effective degaussing.

Figure 4:
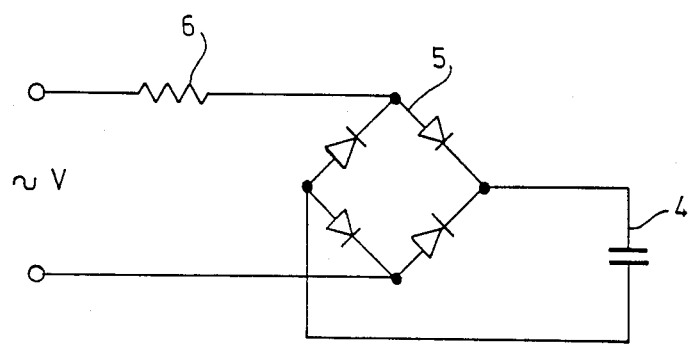
FIG. 4 shows part of switched mode power supply in which a surge limiting resistor is used in a conventional manner.
Figure 5:
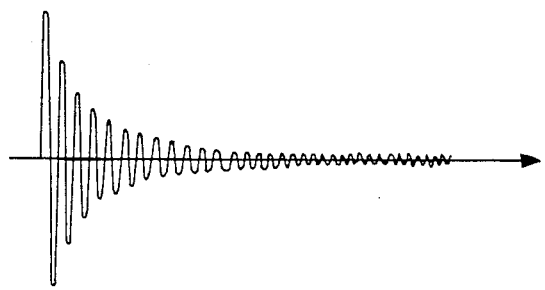
FIG. 5 shows the surge/degauss current characteristic of such an arrangement.

FIG. 4 is a schematic of part of a conventional switched mode power supply used in the aforementioned IBM 5279 color display and in which the SMPS reservoir capacitor 4 is charged by current flowing through the input rectifier 5 and surge limiting resistor 6. If the resistance of resistor 6 is sufficiently large and no load is imposed across capacitor 4, it will be seen that the current waveform is of an exponentially decaying form. For a typical input reservoir capacitance value of 220 µF., a resistor of 75 ohms will give the waveform of FIG. 5, limiting the maximum surge current to about 4.5 amps.

In accordance with the present invention, the resistor 6 is replaced by means of a suitably chosen degauss coil and, providing there is no load, a substantially ideal degauss current waveform decaying to zero is achieved. This can be easily achieved in a conventional SMPS by delaying the time at which the control module turns on, for example by increasing the "soft start" duration.

Figure 6:
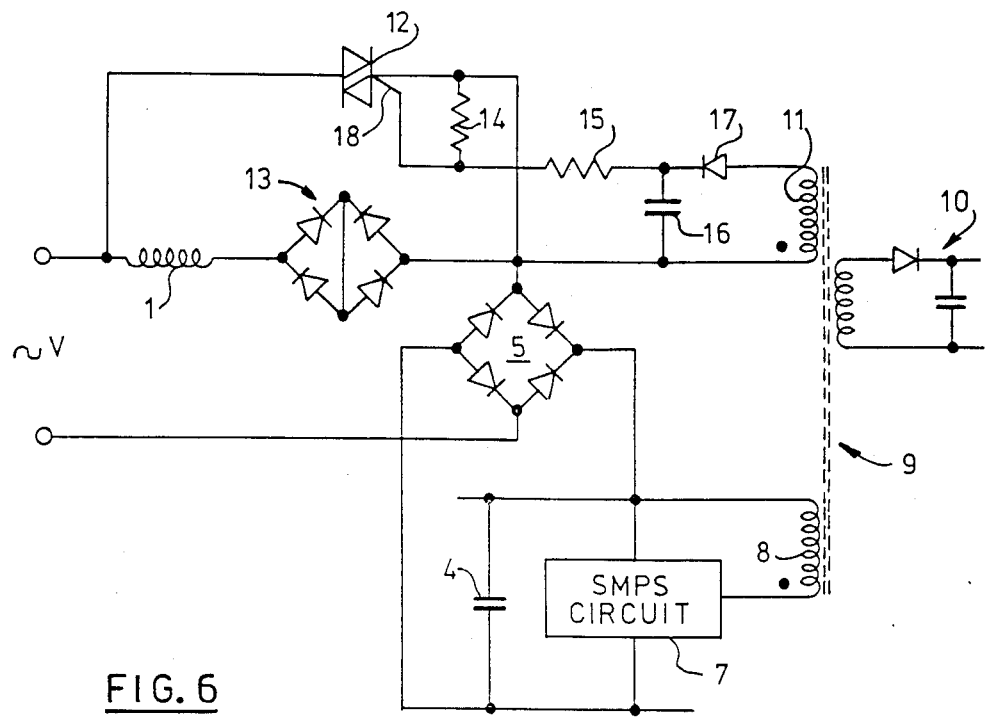
FIG. 6 shows a preferred embodiment of the invention in which a degauss coil is used to limit current surge.

FIG. 6 shows the complete circuit in which the main voltage V is applied across the SMPS input rectifier 5 through the degauss coil 1 (of resistance, for example, of 75 ohms). Also shown in FIG. 6 is the SMPS circuit 7 which controls the flow of current in the primary winding 8 of the SMPS output transformer 9. Also wound on the transformer 9 are secondary windings to provide secondary outputs, representatively and schematically illustrated by 10 and an auxiliary winding 11 whose purpose is to control a switch 12, preferably constituted by a triac as illustrated. The winding 11 has such a polarity that as the SMPS switching transistor within SMPS circuit 7 turns on, the switch (triac) 12 in parallel with the degauss coil 1 also switches on to short the coil 1 before any significant current is drawn from the SMPS input reservoir capacitor 5 (220 µF.) and thus from the main supply V.

In practice there will be some forward voltage drop (about 1 volt) across the triac, but this can be negated by means of four back-to-back diodes constituting a low voltage bridge 13 in series with the coil 1. This will reduce the residual current in the degauss coil to less than 200 µA which is about 10% of that typically obtained using a thermistor. Moreover, as there are no thermal coefficients involved, the circuit will operate again almost immediately after power off. Bleed resistor 15 of value 1 Kohm, limits the control current flowing through diode 17 to the gate 18 of the triac 12. Resistor 14 (1 Kohm) allows decay of charge in reservoir capacitor 16 (100 µF). If a relay is used for the switch 12 instead of a triac, there will be no need for the compensating diode bridge 13.

Figure 7:
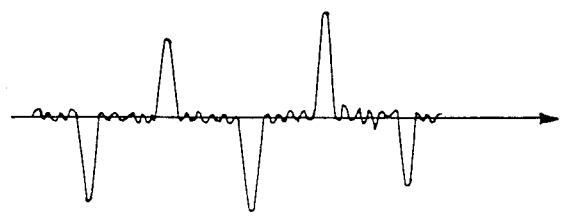
FIG. 7 shows the residual degauss current characteristic obtained in the circuit shown in FIG. 6.

FIG. 7 shows the residual current waveform after the SMPS has started up and the triac short circuits the degauss coil 1. The current pulses of about 0.4 to 0.5 mA occurring every 10 msec are due to uncompensated residual current.

What has been described is an arrangement for a color cathode ray tube display in which the degauss coil is used not only for degaussing the CRT during power on but also serves to reduce the power on surge current to the SMPS from about 50 amps to less than 5 amps, the residual degauss current being reduced, for practical purposes, to almost zero. The degauss circuit will operate again within seconds of powering off and no power is dissipated during normal operation. The circuit has the additional benefit that it can be used over a full range of operating input voltages (90 to 265 volts) without component changes, a significant advantage for portable television sets but also of significance for non-portable displays since it allows a single display to be built for differing main voltages. Although the circuit shown in FIG. 6 would cost more than the conventional approach of a positive coefficient thermistor to cause exponential decay of the degauss current plus a negative coefficient thermistor to limit current surge into the SMPS, this difference in cost is not significant.

While the invention has been described with respect to particular embodiments above, it would be understood by those skilled in the art that modifications may be made without departing from the spirit and scope of the present invention. These embodiments are for the purposes of example and illustration only and are not to be taken to limit the scope of the invention narrower than the scope of the appended claims.

I claim:

1. A color cathode ray tube display connected to a main power supply comprising:
    a switched mode power supply, which turns on after the surge current diminishes to zero,
    a degauss coil connected to said main power supply to degauss the cathode ray tube during power on of the display, and said coil also connected in series with the input of said switched mode power supply to limit surge current, and
    a switch connected across said degauss coil to short out said coil after said switched mode power supply has turned on.

2. A display as recited in claim 1, in which said switched mode power supply further comprises:
    an output transformer having a primary winding, a plurality of secondary windings, and an auxiliary winding, said auxiliary winding controlling said switch across said coil.

3. A display as recited in claim 1, in which said switch is comprised of a triac having a gate connected to receive control current after the switched mode power supply has turned on.

4. A display as recited in claim 2, in which said switch is comprised of a triac having a gate connected to receive control current after said switched mode power supply has turned on.

5. A display as recited in claim 3, in which a low voltage diode bridge is connected in series with said degauss coil to compensate for the forward voltage drop across said triac and thereby to reduce the residual current in said degauss coil.

6. A display as recited in claim 4 in which a low voltage diode bridge is connected in series with said degauss coil to compensate for the forward voltage drop across said triac and thereby to reduce the residual current in said degauss coil.

7. A color cathode ray tube display connected to a main power supply comprising:
   a switched mode power supply, which turns on after the surge current diminishes to zero,
   a degauss coil connected to said main power supply to degauss the cathode ray tube during power on of the display, and said coil also connected in series with the input of said switched mode power supply to limit surge current,
   a triac having a gate connected to receive control current after said switched mode power supply has been turned on, said triac connected across said degauss coil to short out said coil after said switched mode supply has turned on, and
   a low voltage diode bridge connected in series with said degauss coil to compensate for the forward voltage drop across said triac and thereby to reduce the residual current in said degauss coil.

8. A display as recited in claim 7, in which said switched mode power supply comprises:
   an output transformer having a primary winding, a plurality of secondary windings and an auxiliary winding, said auxiliary winding controlling said triac across said coil.

* * * * *